(12) United States Patent
Barritt

(10) Patent No.: US 6,271,504 B1
(45) Date of Patent: Aug. 7, 2001

(54) VERSATILE SURFACE HEATING CARTRIDGE FOR COOKING APPLIANCE

(75) Inventor: William D. Barritt, Cleveland, TN (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 09/690,849

(22) Filed: Oct. 18, 2000

(51) Int. Cl.⁷ .............................. H05B 3/68; A23L 29/02; F24C 15/10
(52) U.S. Cl. ........................ 219/452.13; 99/339; 126/211
(58) Field of Search .............................. 219/450.1, 451.1, 219/452.11, 452.12, 452.13, 453.13; 99/339, 340, 376, 377, 378, 379; 126/39 H, 39 J, 39 M, 90 A, 92 AC, 211, 217, 214 A

(56) References Cited

U.S. PATENT DOCUMENTS

| | | |
|---|---|---|
| 2,156,216 | 4/1939 | Russell et al. . |
| 2,422,950 | 6/1947 | Cash . |
| 2,798,930 * | 7/1957 | Frost ................................... 219/392 |
| 3,172,999 | 3/1965 | Sutton et al. . |
| 3,281,577 | 10/1966 | Altemiller . |
| 3,493,726 | 2/1970 | Bardeau . |
| 3,797,375 | 3/1974 | Cerola . |
| 3,947,657 | 3/1976 | Ershler . |
| 3,978,238 | 8/1976 | Frey et al. . |
| 4,088,067 | 5/1978 | Kaebitzsch et al. . |
| 4,415,788 | 11/1983 | Field . |
| 4,431,892 | 2/1984 | White . |
| 4,549,052 | 10/1985 | Simon . |
| 4,987,827 | 1/1991 | Marquez . |
| 5,129,313 | 7/1992 | Coppier . |
| 5,287,799 * | 2/1994 | Pickering et al. ..................... 99/446 |
| 5,570,625 | 11/1996 | Liebermann . |
| 5,606,905 | 3/1997 | Boehm et al. . |
| 5,615,604 | 4/1997 | Chenglin . |
| 5,655,434 | 8/1997 | Liebermann . |
| 5,701,804 | 12/1997 | Liebermann . |
| 5,847,369 | 12/1998 | Barritt . |
| 6,016,741 | 1/2000 | Tsai et al. . |
| 6,062,130 | 6/2000 | Brady . |

* cited by examiner

Primary Examiner—Sang Paik
(74) Attorney, Agent, or Firm—Diederiks & Whitelaw, PLC

(57) ABSTRACT

A versatile surface cooking cartridge for use in an appliance includes a lower container portion to which is attached a lid member. A first heating element is arranged in the lower container portion and a second heating element is carried by and extends along a lower surface of the lid member. Separate controls are provided for selectively operating the first and second heating elements, either individually or simultaneously. A rack is positioned in the lower container portion, above the first heating element, to enable food items to be cooked on the rack by either or both of the first and second heating elements. In addition to or in the alternative of performing a selected cooking operation within the lower container portion, the upper surface of the lid member preferably defines a further cooking surface upon which additional cooking operations can be performed through operation of at least the second heating element.

12 Claims, 3 Drawing Sheets

VERSATILE SURFACE HEATING CARTRIDGE FOR COOKING APPLIANCE

BACKGROUND OF THE INVENTION

1. Field of the Invention

The present invention pertains to the art of cooking appliances and, more particularly, to a replaceable surface heating cartridge for use in performing multiple cooking operations.

2. Discussion of the Prior Art

In the art of cooking, it is commonly known to utilize surface heating elements for various cooking operations, including boiling, grilling, frying, steaming and the like, depending on the particular type of pan or other cooking container utilized. Such surface heating elements, whether of the gas or electric type, are typically incorporated as part of a cooktop which is either mounted within a cutout portion of a kitchen countertop or formed as part of a range. Most often, the surface heating elements are intended to only be replaced if damaged. That is, it is common to design a cooktop or range for use with a particular set of heating elements, with generally two front heating elements and two rear heating elements which can be individually, selectively controlled.

The desire to provide more versatility in the type of cooking operations which can be readily performed with the surface heating elements has also been recognized. Therefore, certain cooking appliance models are specifically designed to be used with replaceable cartridges. For instance, it is known to form a cooking surface with various wells, with each well being able to selectively receive either a pair of individually controllable surface heating elements or a single, enlarged grilling unit. Such an arrangement enhances the versatility of the overall cooking appliance.

Although considered to have its advantages, such a multipurpose heating system does require the consumer to make a change between various cooking elements when it is desired to carry out certain different cooking operations. Based on the above, there still exists a need in the art of cooking appliances for a more versatile cooking cartridge which can be initially supplied for a cooktop or range, or which can be utilized as a replacement cartridge. In any event, there is a need for a versatile cartridge which defines multiple cooking surfaces and can be used to perform a variety of cooking operations, preferably inclusive of certain cooking operations typically dedicated to an oven, without the need to change the cartridge.

SUMMARY OF THE INVENTION

The present invention is directed to a versatile surface cooking cartridge which can be effectively used to perform a variety of cooking operations, preferably including baking, broiling, grilling and frying. In accordance with a preferred embodiment of the invention, a cooking cartridge includes a lower container portion to which is pivotally attached a lid member. Within the lower container portion is arranged a first heating element. A second heating element is carried by and extends along a lower surface of the lid member. Separate controls are provided for selectively operating the first and second heating elements, either individually or simultaneously. A rack is positioned in the lower container portion, above the first heating element.

With this arrangement, the cartridge can function to cook food placed upon the rack, with the first heating element being operated alone, the lid closed and both the first and second heating elements activated, or the lid closed and just the second heating element being activated. In addition to or in the alternative of performing a cooking operation within the lower container portion, the upper surface of the lid member preferably defines a further cooking surface, such as a smooth, flat cooking surface, upon which one or more additional cooking operations can be performed upon heating the surface through the operation of at least the second heating element. Therefore, the upper surface of the lid member can be directly used in performing frying operations, or simply as a heating surface upon which a pan or the like can be placed for even further cooking modes.

In any event, the cooking cartridge of the invention represents a versatile and convenient arrangement which can be readily provided with newly produced cooking appliances or supplied as a replacement cartridge useable in existing cooking appliances designed for use with removable cartridges. Additional objects, features and advantages of the invention will become more readily apparent from the following detailed description of a preferred embodiment, when taken in conjunction with the drawings wherein like reference numerals refer to corresponding parts in the several views.

DETAILED DESCRIPTION OF THE PREFERRED EMBODIMENT

Figure 1:
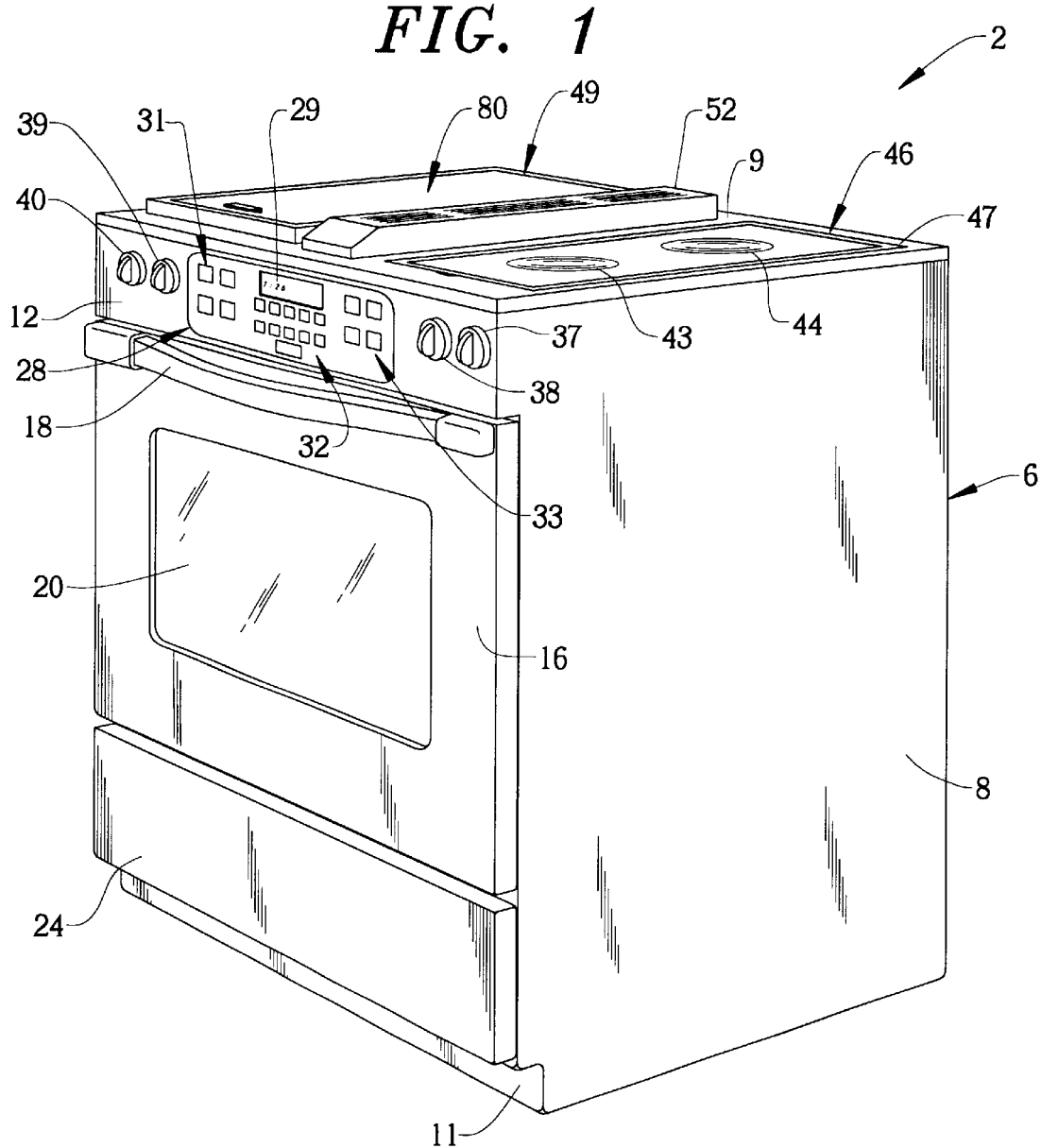
FIG. 1 is a perspective view of a cooking appliance incorporating a replaceable cooking cartridge constructed in accordance with the present invention.

With initial reference to FIG. 1, a cooking appliance, generally indicated at 2, is shown to take the form of a range. Cooking appliance 2 includes a cabinet 6 including opposing side panels 8, a cooktop 9, a rear panel (not shown) and a front panel 11. An upper portion of front panel 11 defines a face 12 that includes a plurality of controls as will be more fully described below. Arranged below upper front face 12 is an oven door 16 having a handle 18 and a window 20. In a manner known in the art, door 16 can be pivoted to access an interior oven cavity (not separately labeled) of cooking appliance 2. Also, as shown, cooking appliance 2 includes a lower drawer 24 for use in storing pans and the like.

In the embodiment illustrated, upper front face 12 is provided with a central oven control section 28 that includes a display 29 and various sets of control buttons 31–33. Although not considered part of the present invention, for sake completeness, control button set 31 is preferably utilized to establish a desired mode of operation for the oven of cooking appliance 2, control button set 32 represents a numeric pad including a cancel button, and control button set 33 represents program buttons for establishing desired cook times, clock settings and the like. In addition, upper front face 12 is provided with a plurality of element control knobs 37–40. In this embodiment, element control knobs 37 and 38 are utilized to control the operation of upper heating elements 43 and 44 respectively. In the most preferred embodiment, upper heating elements 43 and 44 are integrated into a first cartridge 46 which is adapted to be selectively placed within a first opening 47 formed in cooktop 9. As will be detailed more fully below, element control knobs 39 and 40 are adapted to control the operation of a second cartridge 49 that is received within a second opening 50 (also see FIG. 4) formed in cooktop 9.

Figure 2:
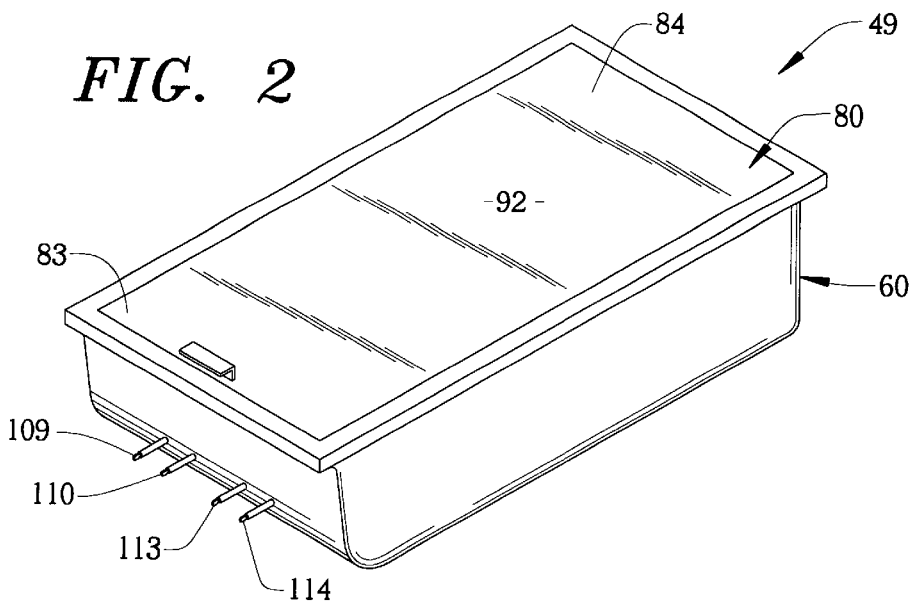
FIG. 2 is a perspective view of the cooking cartridge of FIG. 1 in a closed condition.

Also illustrated in accordance with the preferred embodiment is a downdraft grill 52 that is arranged between first and second cartridges 46 and 49. In a manner generally known in the art, downdraft grill 52 is used in combination with a blower element to exhaust smoke or the like when cooking on cooktop 9. The overall downdraft system can be controlled through one of the buttons in central oven control section 28 or automatically whenever any one of element control knobs 37–40 are placed in an activated state. In general, with the exception of second cartridge 49 and its manner of operation, the construction and operation of cooking appliance 2 is known in the art. Therefore, additional details of this construction or operation will not be provided here. Instead, reference will now be made specifically to FIGS. 2–4 in describing a preferred construction and operation of second cartridge 49.

As shown, second cartridge 49 is defined by a lower container portion 60 that includes a base 63, as well as front, rear and opposing sidewalls 64–67. Walls 64–67 terminate, at an uppermost portion thereof, in a peripheral rim 70. Spaced from base 63, each opposing sidewall 66 and 67 is preferably formed with an inwardly projecting, fore-to-aft extending rail, one of which is shown at 73 on sidewall 66. The opposing rail 73 is preferably provided at the same height so as to extend in a commensurate horizontal plane.

Figure 3:
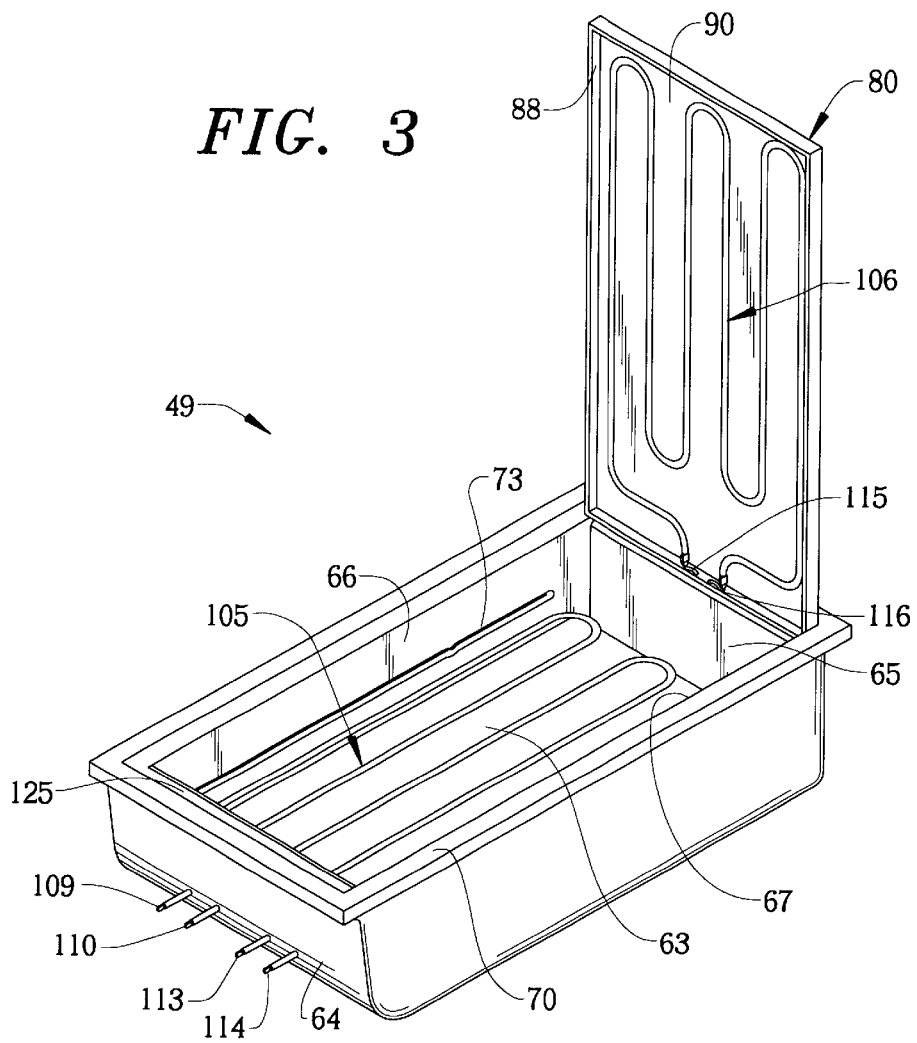
FIG. 3 is a perspective view of the cooking cartridge in an open condition.

Second cartridge 49 also preferably includes a cover or a lid member 80 having a front end portion 83 and a rear end portion 84. Rear end portion 84 is hinged at 86 to lower container portion 60 such that lid member 80 can pivot between a raised position shown in FIG. 3 wherein access to within lower container portion 60 is permitted, and a lowered or closed position generally shown in FIG. 2. As best shown in FIG. 3, lid member 80 preferably includes a down-turned peripheral edge 88 which projects away from an inner surface 90. Lid member 80 also includes an outer surface 92 which, in the preferred embodiment, is substantially smooth. In the most preferred embodiment, both lower container portion 60 and lid member 80 are formed of metal and, most preferably, steel. Also, as shown in these figures, lid member 80 preferably has a thickness which is in the order of 2–4 times that of any of walls 64–67 of lower container portion 60. In order to aid in shifting of lid member 80 between its raised and lowered positions, a handle 96 is provided at front end portion 83. In general, handle 96 is generally shown to be constituted by an angled member, however, a wide range of handle arrangements could be readily utilized.

Figure 4:
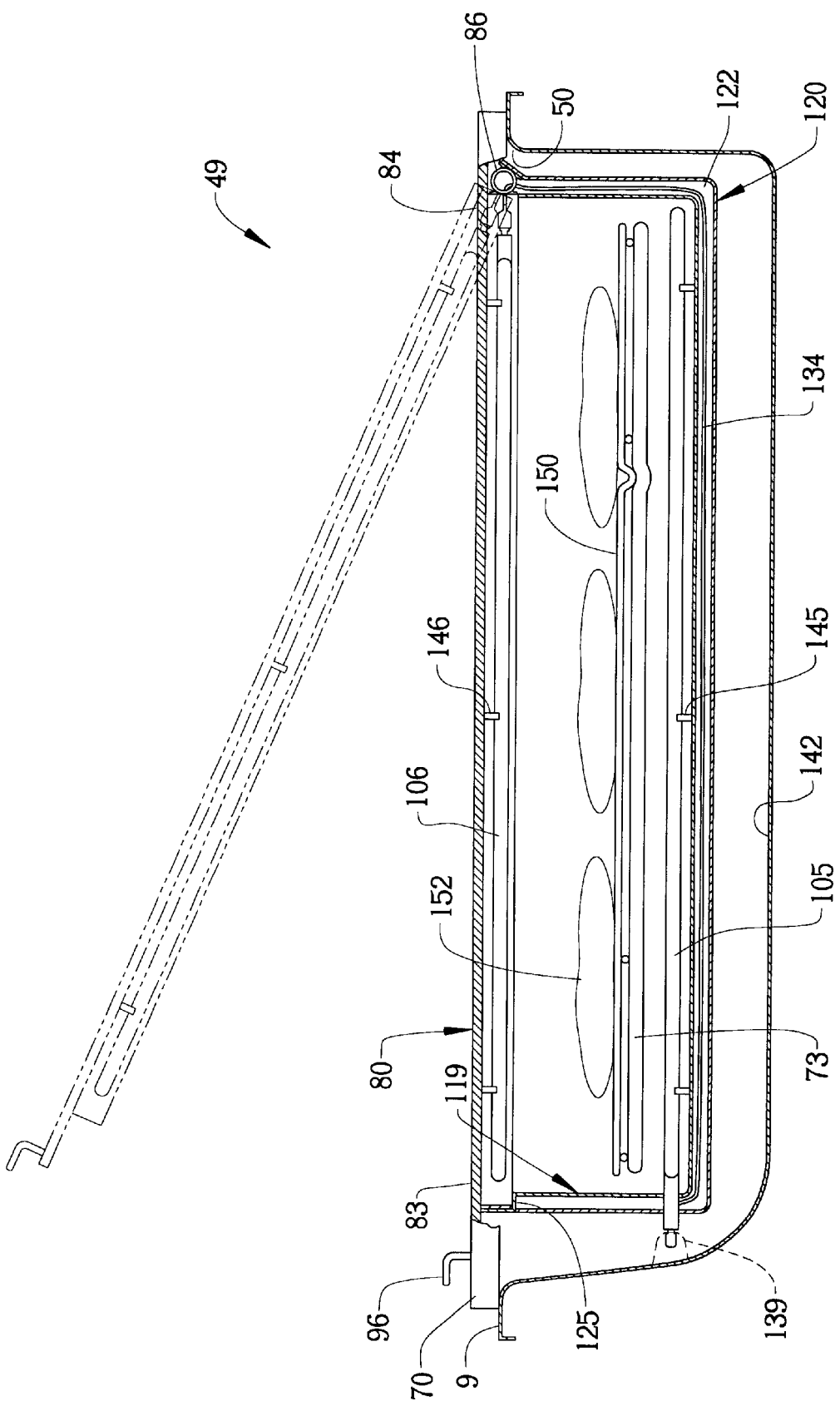
FIG. 4 is a cross-sectional side elevational view of the cooking cartridge shown in FIGS. 1–3.

Second cartridge 49 also includes first and second heating elements 105 and 106, each of which is preferably constituted by an electric, sheathed, resistance-type heating element. As shown, first heating element 105 is positioned within lower container portion 60, vertically between base 63 and rails 73. More specifically, first heating element 105 extends in a generally serpentine path within lower container portion 60 and terminates in a first set of electrical connecting prongs 109 and 110 which project out through front wall 64 of lower container portion 60. Adjacent first set of electrical connecting prongs 109 and 110 is a second set of connecting prongs 113 and 114 which are associated with second electric heating element 106. Second electric heating element 106 is attached to lid member 80 directly adjacent to inner surface 90. More specifically, as generally shown in FIGS. 3 and 4, second electric heating element 106 is preferably surrounded by inner surface 90 and down-turned peripheral edge 88 adjacent hinge 86. Second electric heating element 106 terminates in a third set of electrical connecting prongs 115, 116. As will be discussed more fully below, the third set of electrical connecting prongs 115 and 116 are electrically interconnected to the second set of prongs 113 and 114.

As shown in FIG. 4, lower container portion 60 is preferably defined by inner and outer housings 119 and 120 having a channel 122 therebetween. The upper periphery of channel 122 is closed off by means of a ledge 125 formed as part of inner housing 119. It is upon ledge 125 that downturned peripheral edge 88 of lid member 80 preferably rests upon closing of lid member 80. In any event, inner and outer housings 119 and 120 are preferably welded or otherwise fixedly secured about ledge 125 in order to form lower container portion 60. The third set of electrical connecting prongs 115, 116 are electrically interconnected to the second set of connecting prongs 113, 114 by means of respective wires 134 which are routed through channel 122 between the respective prongs 113–116.

It is known in the art to provide replaceable cartridges in both electric and gas cooking appliances. For example, it would be possible to replace first cartridge 46 with a grilling cartridge in accordance with prior proposals. Second cartridge 49, constructed in accordance with the present invention, is therefore presented as an alternative, replaceable cartridge. However, second cartridge 49 is constructed to operate in a versatile manner to enable various cooking operations to be performed therewith. These various cooking operations will be detailed more fully below. At this point, it should be noted that, in order to receive second cartridge 49 or another replaceable cartridge constructed in a manner known in the art, cooking appliance 2 preferably includes various electrical junctions, one of which is indicated at 139 in FIG. 4, located within a recessed well 142. Therefore, with this construction, second cartridge 49 can be inserted within well 142, with the first and second sets of electrical connecting prongs 109, 110 and 113, 114 creating an electrical circuit through first and second electric heating elements 105 and 106. As indicated above, the activation of the first and second electric heating elements 105 and 106 are selectively controlled through control knobs 39 and 40 respectively. With this arrangement, first and second heating elements 105 and 106 can be individually or simultaneously operated at varying settings in a manner generally corresponding to conventional surface heating elements such as those represented by elements 43 and 44.

When second cartridge 49 is mounted within recessed well 142, first electric heating element 105 is preferably spaced above base 63 and below rails 73 through the use of a plurality of support legs 145. In a similar manner, second electric heating element 106 is spaced below inner surface 90 or lid member 80 by support legs 146. In general, it is known in the art of ovens to utilize electric resistance-type, sheathed heating elements having wire support legs attached thereto. In the present embodiment, support legs 145 and 146 are simply also welded or otherwise secured to base 63 and lid member 80 respectively.

During use, a rack 150 is adapted to be supported across rails 73. Rack 150 can be used to support various food items, such as patties as indicated at 152 in FIG. 4, for cooking the same. In accordance with the preferred construction of second cartridge 49, a wide range of cooking operations can be performed on cooktop 9. For example, with lid member 80 closed and first electric heating element 105 activated, a baking or grilling operation can be performed within lower container portion 60. A broiling operation could also be selectively performed by activated second electric heating element 106 instead of first electric heating element 105. A combination cooking arrangement can be provided by activating both first and second heating elements 105 and 106. In addition, since outer surface 92 of lid member also defines a cooking surface, outer surface 92 can be heated by the activation of second electric heating element 106 such that objects can be directly fried upon lid member 80. In a further alternative, pans or the like can be placed directly on outer surface 92 of lid member 80 for even further cooking modes. Again, cartridge 49 can be selectively replaced such that it represents an additional alternative available to a consumer. In this manner, second cartridge 49 can be provided with a newly produced cooking appliance 2 or supplied as a replacement cartridge for existing cooking appliances designed for use with removal cartridges.

Although described with respect to a preferred embodiment of the present invention, it should be readily apparent that various changes and/or modifications can be made to the invention without departing from the spirit thereof. For example, although second heating element 106 is directly exposed upon opening of lid member 80, a shield or the like could be provided to further cover second heating element 106. In addition, although lid member 80 is preferably hinged at rear end portion 84, other hinge locations or mounting arrangements could be utilized. Furthermore, the particular location and construction of the electrical connection for cartridge 49 could also greatly vary according to the invention. In general, the invention is only intended to be limited by the scope of the following claims.

I claim:

1. In an appliance including a cooktop provided with at least one removable surface heating unit, a replaceable, integrated heating cartridge comprising:

a lower container portion adapted to be positioned, at least in part, within an opening formed in the cooktop;

a first heating element extending within the lower container portion;

a food support member positioned in the lower container portion above the first heating element;

a lid member having an upper surface and a lower surface, said lid member being movable, relative to the lower container portion, between a lowered position wherein the lid member substantially covers the lower container portion, and a raised position wherein an interior of the lower container portion is exposed;

a second heating element carried by and extending along the lower surface of the lid member; and at least one control member for selectively activating and deactivating each of the first and second heating elements, wherein one or more of the first and second heating elements can be activated for selectively cooking food placed on the support member within the lower container portion and on the upper surface of the lid member.

2. The heating cartridge according to claim 1, wherein the upper surface comprises a substantially smooth cooking surface adapted to be heated from within the lower container portion by activation of the second heating element.

3. The heating cartridge according to claim 2, further comprising: a handle provided on the lid member for pivoting of the lid member between the lowered and raised positions.

4. The heating cartridge according to claim 2, wherein each of the first and second heating elements are defined by sheathed, electric resistance-type heating elements.

5. The heating cartridge according to claim 2, further comprising: a plurality of electrical prongs projecting from the lower container portion, each of said prongs being electrically connected to a respective one of the first and second heating elements.

6. The heating cartridge according to claim 5, wherein the lid member is pivotable about a hinge axis, said second heating element being electrically linked to at least one of the prongs directly adjacent the hinge axis.

7. The heating cartridge according to claim 6, wherein the second heating element is electrically linked to the at least one of the prongs through a wire.

8. The heating cartridge according to claim 7, wherein the electrical prongs project from a frontal section of the lower container portion and the hinge axis is arranged at a rear section of the lower container portion.

9. The heating cartridge according to claim 8, wherein the lower container portion includes inner and outer housings with a channel therebetween, said wire being routed through said channel.

10. The heating cartridge according to claim 2, wherein said lower container portion further includes and upper peripheral support rim, said peripheral support rim being supported upon the cooktop.

11. The heating cartridge according to claim 2, further comprising: at least a pair of opposing rails provided in the lower container portion, said food support member being removably supported on the rails.

12. The heating cartridge according to claim 1, wherein the lower container portion includes inner and outer housings with a channel therebetween.

\* \* \* \* \*